United States Patent [19]

Yanko

[11] Patent Number: 4,662,498

[45] Date of Patent: May 5, 1987

[54] HEAVY DUTY FRICTION CLUTCH

[75] Inventor: John P. Yanko, Liverpool, N.Y.

[73] Assignee: Lipe Corporation, Branford, Conn.

[21] Appl. No.: 668,613

[22] Filed: Nov. 5, 1984

[51] Int. Cl.⁴ .................. F16D 13/50; F16D 13/75
[52] U.S. Cl. ........................... 192/70.29; 192/70.3;
192/99 A; 192/110 R
[58] Field of Search ............... 192/70.29, 70.3, 99 A,
192/70.25, 110 R

[56] References Cited

U.S. PATENT DOCUMENTS

| | | | |
|---|---|---|---|
| 1,788,806 | 1/1931 | Ruesenberg | 192/70.29 |
| 2,250,883 | 4/1941 | Adamson et al. | 192/99 A |
| 2,947,398 | 8/1960 | Willene | 192/99 A |

Primary Examiner—Rodney H. Bonck
Assistant Examiner—David A. Testardi
Attorney, Agent, or Firm—Neuman, Williams, Anderson & Olson

[57] ABSTRACT

A friction clutch wherein the mechanical advantage or lever ratio can be varied without changing the construction of the release levers. This is achieved by changing the location of the pivot pins that connect the levers to the pressure plate, and by elongating the release lever holes through which the pivot pins pass. Changing the location of a pivot pin with respect to its supporting lugs on the pressure plate will cause a change in the location of the pin along the length of the elongated pivot pin holes in its corresponding release lever, and this in turn operates to change the mechanical advantage exerted by the lever on the pressure plate.

6 Claims, 5 Drawing Figures

HEAVY DUTY FRICTION CLUTCH

BACKGROUND OF THE INVENTION

This invention relates generally to friction clutches, and has particular reference to a novel clutch construction that permits variations in the release lever ratio without in any way changing the structure of the lever itself.

As is well known in the art, the free inner ends of the release levers of heavy duty vehicular clutches are either pushed or pulled by the release mechanism to move the clutch pressure plate out of engagement with the friction disc and thereby disengage the clutch. It is recognized also that it is desirable to vary the mechanical advantage exerted by the release levers on the clutch pressure plate according to the clutch construction. Thus, for example, it is desirable to provide a high mechanical advantage in single disc clutches because high spring forces are needed in such a clutch. On the other hand, in two disc clutches a lower mechanical advantage must be applied to allow increased retraction of the pressure plate for proper clutch disengagement.

Heretofore, different mechanical advantage requirements have resulted in the need for different release lever systems. This in turn has required clutch manufacturers to maintain two different kinds of tooling and separate parts inventories, all of which increases the cost of manufacture.

SUMMARY OF THE INVENTION

In the friction clutch of the present invention the mechanical advantage or lever ratio can be varied without changing the construction of the release levers. This eliminates the necessity for keeping a number of different levers in stock. Variation in mechanical advantage is achieved by changing the location of the pivot pins that connect the levers to the pressure plate. This may be accomplished by providing the release levers with elongated holes through which the pivot pins pass. Thus, changing the location of a pivot pin with respect to its supporting lugs on the pressure plate will cause a change in the location of the pin along the length of the elongated pivot pin holes in its corresponding release lever and this in turn operates to change the mechanical advantage exerted by the lever on the pressure plate.

The applicant is not aware of any prior art that addresses the problem addressed by the present invention. In the past, the pivot pin holes in release levers have been made slightly out-of-round to permit the levers to swing through their arcs without binding. This was not done to permit variation in the lever ratio, and the relative motion between the pivot pin and the pin holes was so small that it would not have had a significant effect on the lever ratio.

DESCRIPTION OF THE PREFERRED EMBODIMENT

Figure 2:
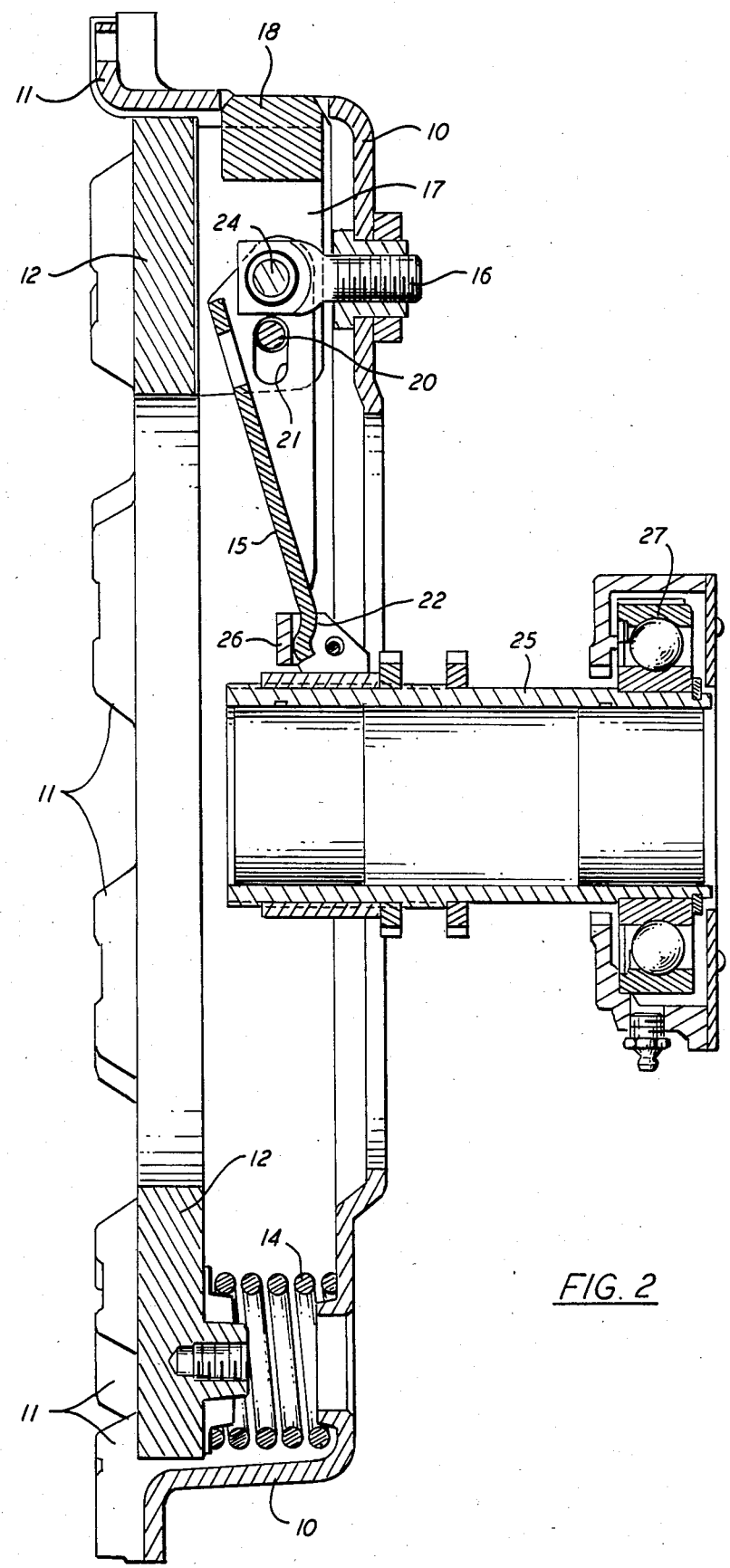
FIG. 2 is a vertical section through the clutch taken substantially on line 2—2 of FIG. 1.

Referring now to the drawings, and with particular reference to FIG. 2, the clutch disclosed herein includes a dished cover member 10 having a plurality of bosses 11 by means of which the cover member can be secured to a driving member in the form of a flywheel (not shown). Positioned in the cover member is an axially movable annular pressure plate 12 that is strongly biased toward the flywheel by compression springs 14. As is conventional, an axially movable friction disc (not shown) is positioned between the pressure plate 12 and the flywheel, and when the clutch is engaged the disc is frictionally engaged by the pressure plate and flywheel whereby it is driven by the latter.

Friction discs of the type employed in the clutch of the invention are disclosed in U.S. Pat. No. 2,863,537 to R. S. Root, which patent is owned by the assignee of this application. The Root patent discloses a pull type clutch incorporating a clutch brake. The friction disc of the invention has a central hub that is connected to the driven shaft (not shown) through a splined connection substantially as shown in the Root patent.

Figure 1:
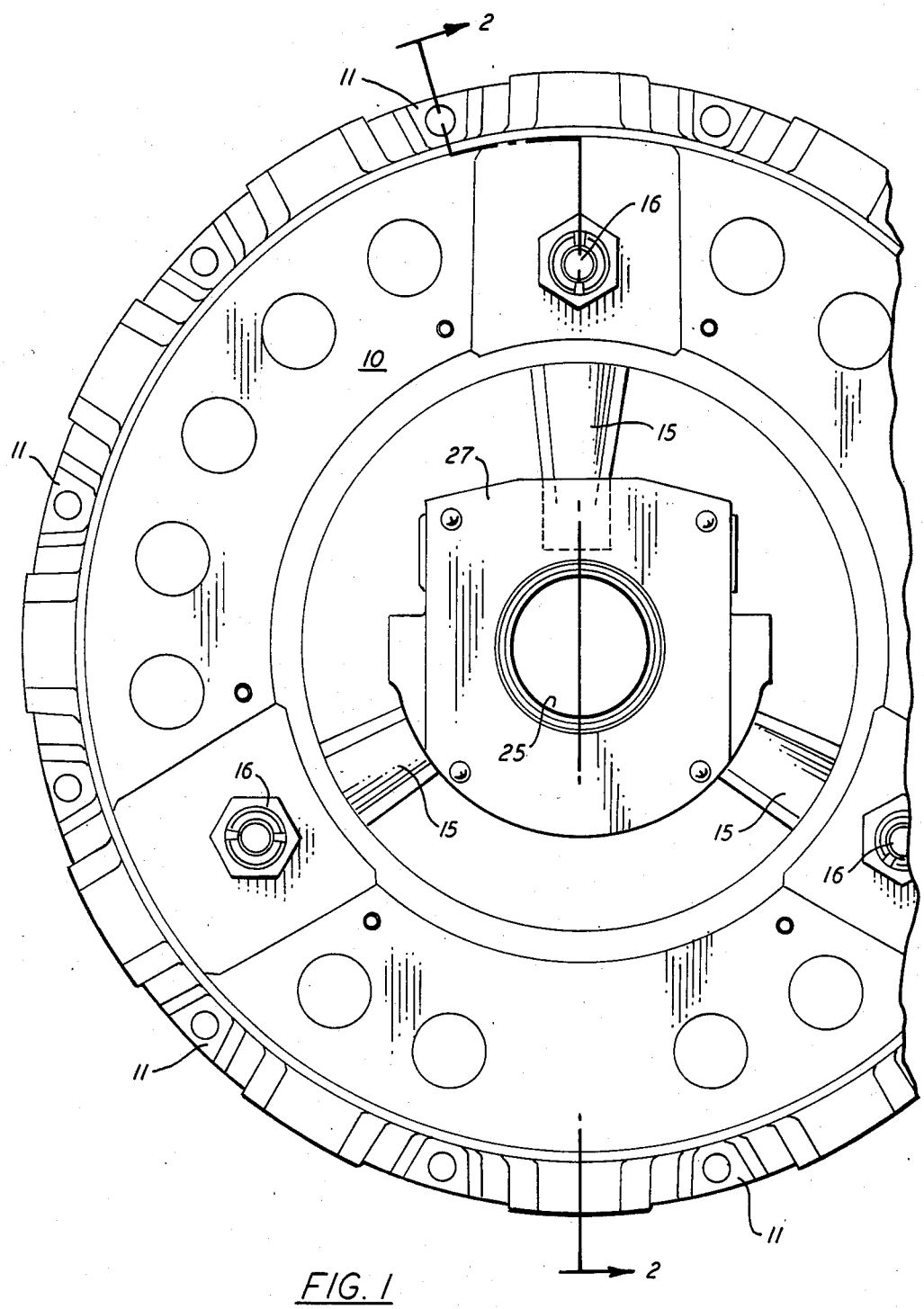
FIG. 1 is a fragmentary rear elevation of a friction clutch embodying the invention.

The driving connection between the driving and driven members of the clutch is disengaged by moving the pressure plate rearwardly (or to the right as viewed in FIGS. 2 and 3), against the bias of springs 14, by means of release levers 15, only one of which is shown. There are three such levers disposed at 120° intervals around the clutch as indicated in FIG. 1. The levers 15 are channel shaped, and each lever is pivotally connected adjacent its outer end to the cover member 10 by a conventional eye bolt assembly 16, FIG. 2.

At each release lever location, the pressure plate 12 has a pair of rearwardly projecting lugs 17 that straddle the release lever and its eye bolt assembly. A guide block 18 fixed to the cover member 10 projects inwardly from the cover member and in between the lugs 17 as indicated in FIG. 2 to drive the pressure plate in rotation and also guide it in its limited axial movement.

Each release lever 15, in addition to its connection to the cover member through an eye bolt assembly 16, is pivotally connected to the pressure plate 12 by means including a pivot pin 20 that is supported by and extends between the pressure plate lugs 17. The pin 20 passes through pivot pin holes 21 in the sides of the release lever and, in accord with the invention, the pin holes are significantly elongated as shown in FIGS. 2 and 3.

The clutch illustrated in the drawings is a pull type clutch which means that when the inner, free ends 22 of the release levers are pulled rearwardly, or to the right in FIG. 2, the levers pivot in the counter clockwise direction about the eye bolt pivot points 24. This operates through the pivot connections 20, 21 between the pressure plate lugs and release levers to move the pressure plate to the right and disengage the clutch. During this pivotal movement, the eye bolt pivot points 24 act as fulcrums for the pivot connections 20, 21.

The actuating means for the release levers 15 is conventional and can be similar to that described in U.S. Pat. No. 2,863,537, cited above. Briefly, this actuating means or release mechanism comprises a sleeve 25 that is axially slidable on the driven shaft, the forward end of the sleeve having brackets 26 threadedly attached thereto in which the free ends 22 of the levers are received. At its rear end, the sleeve 25 carries the usual clutch release bearing 27 that is engaged in conventional manner by a yoke (not shown).

Figure 3:
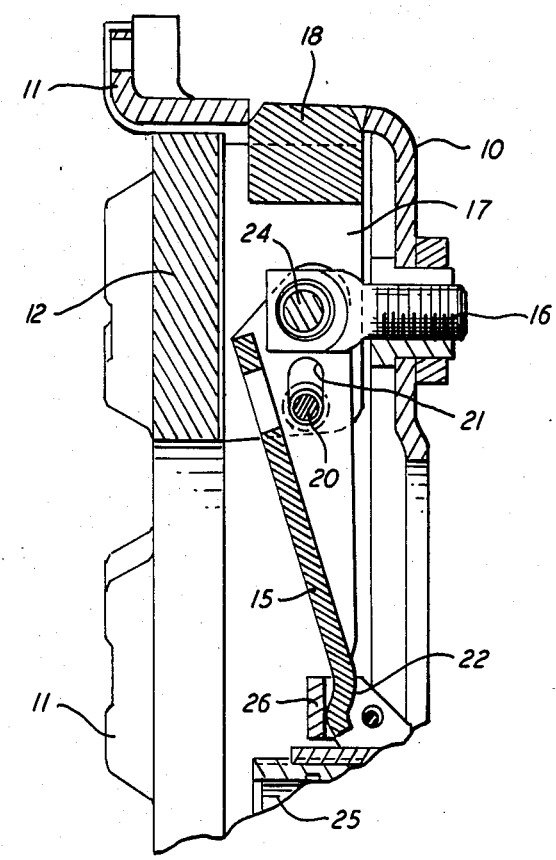
FIG. 3 is a fragmentary vertical section corresponding to FIG. 2 but showing the release lever pivot pin in a different location thereby changing its position in the elongated pivot pin holes in the lever.
Figure 4:
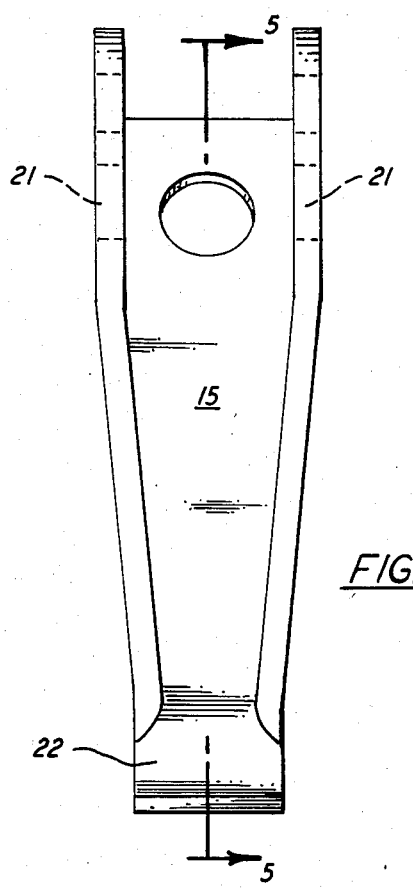
FIG. 4 is an enlarged rear elevation of a release lever of the invention.
Figure 5:
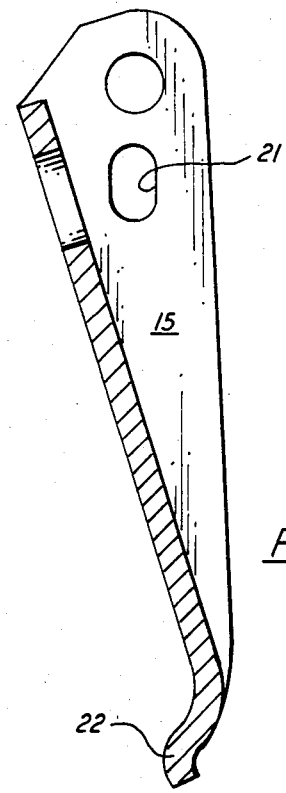
FIG. 5 is a vertical section through lever taken on line 5—5 of FIG. 4.

Referring now to FIG. 3, it will be seen that the pivot pin 20 for the release lever 15 shown has been moved with respect to its supporting lugs 17 so that it is closer to the axis or center of the clutch than it is in FIG. 2. This change in pivot pin location causes the pin to move from the outer to the inner end of the pin holes 21 in the release lever as may be seen from a comparison of FIGS. 2 and 3. The change in the location of the pivot pin in the elongated pin holes 21 changes the lever ratio or the mechanical advantage exerted by the levers on the pressure plate 12.

Because the actuating means for the release levers applies force to the inner ends 22 of the levers, movement of the lever pivot pin 20 from its FIG. 2 to its FIG. 3 location decreases the mechanical advantage that the levers can exert on the pressure plate. Thus, using the example given above, the higher mechanical advantage obtainable by the FIG. 2 pin location makes the FIG. 2 clutch well suited to be a single disc clutch having relatively high spring forces. On the other hand, the lower mechanical advantage resulting from the FIG. 3 pin location makes the FIG. 3 clutch well suited to be a two disc clutch where increased retraction of the pressure plate is required for proper clutch disengagement.

In connection with the foregoing description it should be noted that when the clutch is engaged as shown in FIGS. 2 and 3, the long axes of the pivot pin holes 21 in the release levers are substantially radially disposed with respect to the axis of the clutch. Also, when the location of the pivot pin 20 is changed, its path of movement is a linear path that is substantially radially disposed with respect to the clutch axis. Finally, it should be apparent that the long axes of the pin holes and the linear path of the pivot pins must be substantially coplanar.

From the foregoing description it will be apparent that the invention provides a novel and advantageous clutch construction that permits variations in release lever ratio with only a minimal change in working parts. As will be understood by those familiar with the art, the invention may be embodied in other specific froms without departing from the spirit or essential characteristics thereof.

I claim:

1. In a friction clutch for connecting driving and driven shafts; a dished cover member; a pressure plate located in the cover member; means biasing the pressure plate into engagement with a friction disc when the clutch is engaged; and means for moving the pressure plate out of engagement with the friction disc to disengage the clutch, said last-named means including a release lever pivotally connected adjacent one end to the cover member by means of a cylindrical pin and a complementary cylindrical pin hole combination, and an outwardly projecting lug on the pressure plate located adjacent the release lever pivot connection; the improvement which comprises: means for pivotally connecting the release lever to the pressure plate lug whereby the mechanical advantage exerted by the release lever on the pressure plate can be varied without changing the structure or configuration of the release lever, said connecting means including an elongated pin hole in the release lever and a pivot pin that is supported by the lug and passes through the elongated pin hole, a change in the location of the pivot pin with respect to the lug being operable to change the location of the pin along the length of the release lever elongated pin hole whereby a change in the mechanical advantage exerted by the release lever can be effected.

2. A friction clutch as defined in claim 1 wherein the length of the pin hole is approximately twice the diameter of the pivot pin.

3. A friction clutch as defined in claim 1 wherein release lever is radially disposed in the clutch, and the long axis of the elongated pin hole in the lever is also radially disposed in the clutch.

4. In a friction clutch for connecting driving and driven shafts; a dished cover member; a pressure plate located in the cover member; means biasing the pressure plate into engagement with a friction disc when the clutch is engaged; and means for moving the pressure plate out of engagement with the friction disc to disengage the clutch, said last-named means including a release lever pivotally connected adjacent one end to the cover member by means of a cylindrical pin and a complementary cylindrical pin hole, and a pair of outwardly projecting lugs on the pressure plate arranged so as to straddle the release lever in the area of the release lever pivot connection to the cover member; the improvement which comprises: means for pivotally connecting the release lever to the pressure plate lugs whereby the mechanical advantage exerted by the release lever on the pressure plate can be varied without changing the structure or configuration of the release lever, said connecting means including an elongated pin hole in the release lever and a pivot pin that is supported by the lugs and passes through the elongated pin hole, the long axis of the elongated pin hole being substantially radially disposed with respect to the clutch axis, a change in the location of the pivot pin with respect to its supporting lugs being operable to change the location of the pin along the release lever elongated pin hole whereby a change in the mechanical advantage exerted by the release lever can be effected.

5. A friction clutch as defined in claim 4 wherein the length of the pin hole is approximately twice the diameter of the pivot pin.

6. A friction clutch as defined in claim 4 wherein a change in the location of the pivot pin will take place along a linear path that is substantially radially disposed with respect to the clutch axis.

* * * * *